July 26, 1966  E. L. ZEBROSKI  3,262,860
FLEXIBLE CLAD NUCLEAR FUEL ELEMENT
Filed Dec. 26, 1962  2 Sheets-Sheet 1
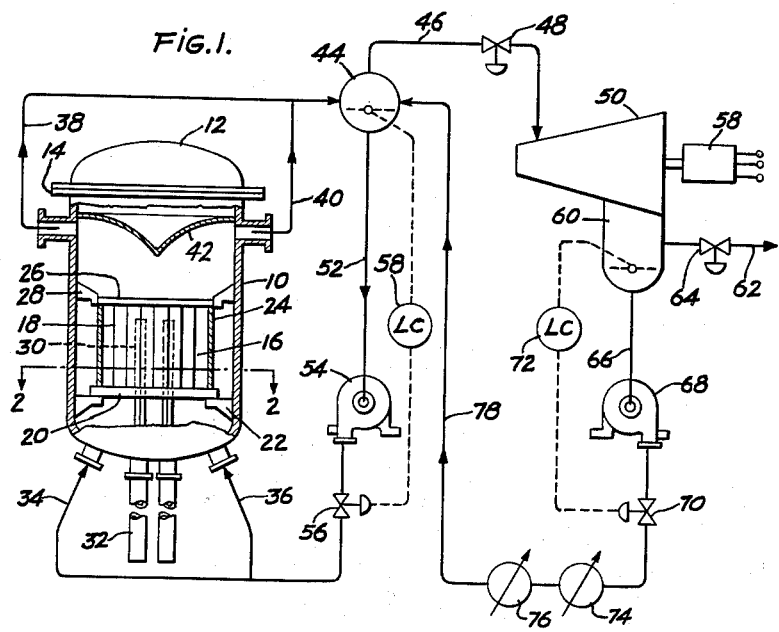
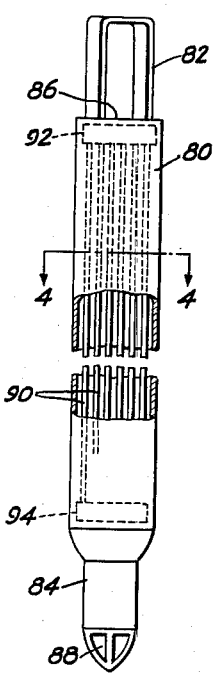
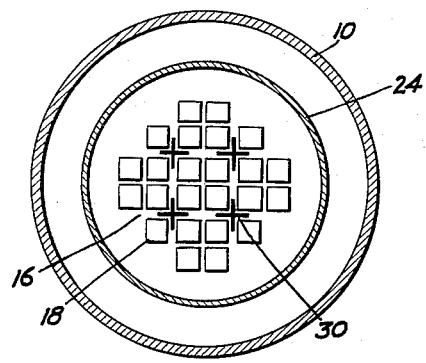
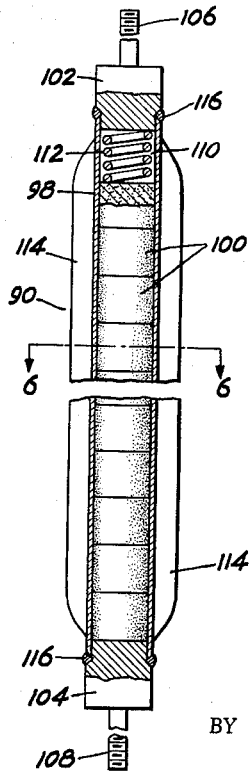
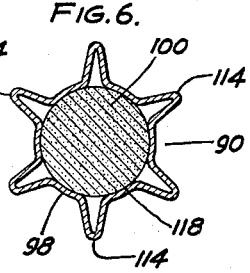
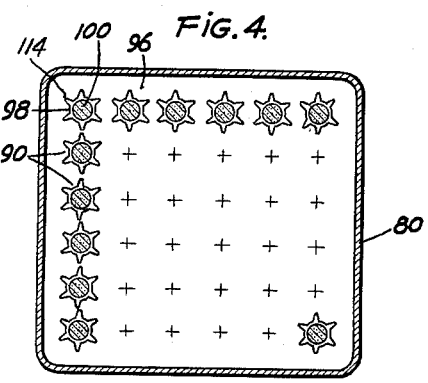
INVENTOR.
EDWIN L. ZEBROSKI
BY
HIS ATTORNEY July 26, 1966  E. L. ZEBROSKI  3,262,860
FLEXIBLE CLAD NUCLEAR FUEL ELEMENT Filed Dec. 26, 1962  2 Sheets-Sheet 2

INVENTOR.
EDWIN L. ZEBROSKI
BY
HIS ATTORNEY

United States Patent Office 3,262,860
Patented July 26, 1966

3,262,860
FLEXIBLE CLAD NUCLEAR FUEL ELEMENT
Edwin L. Zebroski, Los Altos, Calif., assignor to General Electric Company, a corporation of New York
Filed Dec. 26, 1962, Ser. No. 246,925
1 Claim. (Cl. 176—81)

This invention relates broadly to an improvement in nuclear fission reactors, and more particularly to improved nuclear fuel elements for use in the core of such nuclear reactors.

The process of nuclear fission is now quite well known. Briefly, certain atoms such as U-233, U-235, Pu-239 and Pu-241 will undergo disintegration following capture of neutrons of thermal energy in their nuclei. Some other isotopes undergo a disintegration upon capture of higher energy or fast neutrons. In either case, the disintegration or fission produces two or more fission product elements of lower atomic weight, and a number of neutrons greater than one. The great kinetic energy of the fission products is quickly dissipated in any ambient material producing heat. The net generation of neutrons forms the basis for a self-sustaining or chain fission reaction in that these neutrons can be captured by other fissionable atoms and induce subsequent fission events, and so on.

The several types of nuclear reactors in which such fission reactions are effected all involve the disposition of a form of fissionable material as a nuclear "fuel" in a reactor with provision for removing heat liberated in the fuel by flowing some kind of coolant through or near it, and provision for controlling the nuclear reaction and the energy liberation rate. As the reaction proceeds, the fissionable material is gradually consumed and ultimately more must be added. This addition of new fuel can be reduced, and in some cases eliminated, if a nuclear reaction can be made to produce from a "fertile" material one net new fissionable atom per atom used up in the reaction. Th-232 and U-238 are such fertile atoms. Through neutron capture and beta particle decay Th-232 is converted to U-233 which is fissionable by thermal neutrons. Through the same mechanism U-238 is converted to Pu-239 which is also fissionable. The presence of these fertile materials in a nuclear fuel permits the conversion of non-fissionable atoms to fissionable atoms, thus varying degrees of regeneration of fuel can be effected simultaneously with consumption of the original fissionable charge.

It is thus desirable to have nuclear reactor fuel elements which contain both fissionable and fertile atoms. In fast neutron breeder reactor fuels, where subsequent fissions are induced by nuclear capture of neutrons which are not extensively slowed or moderated from their initial velocity, a desirable ratio of fissionable to fertile atoms is of the order of 1 to 5. In thermal reactors, where subsequent fissions are induced by nuclear capture of thermal or very slow neutrons, a desirable ratio is of the order of 1 to 100. In either case, it is desirable to operate the reactor at high specific power in order to reduce to a minimum the quantity of expensive fissionable material. Further, in either kind of reactor, the compounds of U, Pu, and Th are ordinarily used to avoid the undesirable low melting points and growth characteristics of the elemental forms. The high specific power and the compound fuel forms, however, increase the difficulty in removal of heat liberated during the reaction since the thermal conductivity of the usual fuel compounds (such as the oxides, carbides, silicides, and nitrides of U, Th, and Pu) is relatively poor, particularly so in the case of $ThO_2$ and to a lesser extent in the cases of uranium oxide and carbide. At high specific powers, the maximum internal temperature of the fuel element required to drive liberated heat at reasonable rates into the coolant frequently exceeds the melting point of the fuel. $ThO_2$ melts above 5100° F. and $UO_2$ melts at about 4500° F. The resulting problems in fuel element design, particularly with respect to efficient heat transfer, are obvious.

Several known types of nuclear reactors utilize fuel elements of the rod type. Rod type fuel elements usually comprise a tubular member, or clad, of corrosion resistant material in which a series of fuel pellets are placed. The ends of the tubular clad member are sealed with end plugs or caps. The individual fuel rods are secured in position in fixed parallel spaced-apart relation to one another to form a fuel assembly. A plurality of these fuel assemblies are then mounted in the reactor core and positioned so as to permit coolant contact with the individual fuel elements. This corrosion resistant clad serves several purposes. In addition to resisting corrosion by the coolant, the clad provides structural strength to the fuel and prevents the escape of fuel and of fission products to the reactor coolant. It will be obvious to those skilled in the art that the structural strength of the clad must be sufficient to prevent indeterminate distortion under the pressure of the coolant and to fix in position the fuel material under the operating conditions of the reactor core. Heretofore the thickness of the clad tube has been made sufficiently great that it is self-supporting as a pressure vessel and will not collapse under the externally applied full operating pressure of the coolant even if the tube were empty. Further, to facilitate the transfer of energy from the fissionable material of the pellets to the coolant, the clad should accomplish its structural function without excessive parasitic neutron absorption; that is, it should not be excessively thick, and it should be of a material having a low neutron capture cross section. It is also mandatory that the contact between the fuel pellets be such as to provide efficient heat transfer from the internal portion of the fuel element to the coolant in order that maximum fuel performance be realized. Prior art fuel element clads have compromised the desirable heat transfer and parasitic neutron absorption characteristics to acquire the necessary structural strength. To reduce the absorption of neutrons when a material of appreciable capture cross section for thermal neutrons is used as cladding, there is considerable incentive to use cladding which is not self-supporting and which undergoes partial collapse against the fuel material under the action of external coolant pressure. Such collapsed-clad fuel has been found to be operable for considerable periods of time in a power reactor. However, the pattern of collapse of the cladding is variable, depending on the strength of the material, the size of the gap between fuel and clad, and the operating pressures and temperatures. It is observed in both ex-reactor and in-reactor testing that unsymmetrical patterns of ridges and/or folds occur in fuel designs of greatest usefulness— namely, those in which the tube diameter to clad thickness ratio is greater than 35, and with coolant pressures typical of high performance water, gas, or steam-cooled power reactors—namely, over 600 p.s.i.g.

An irregular pattern of ridges results in large localized strains in the clad material. These strains occur repeatedly as the reactor power level varies which causes differential expansion of the fuel and the cladding. The strain cycling results in premature failures of the cladding material, with consequent escape of some fission products from the fuel, and occasionally, escape of some of the fuel material itself.

Such failures have been observed with fuel elements containing high density uranium dioxide pellets clad with type 304 stainless steel where the clad tube diameter to clad thickness ratio was between 35 and 85, and in the operating environment of a boiling water reactor or a pressurized water reactor in an in-pile reactor loop.

Similar observations have been made for fuel consisting of uranium dioxide powder which is brought to high bulk density (80 to 90% of the theoretical density) within the cladding tube by vibratory compaction and/or swaging. Similar behavior is also observed for fuel consisting of various two-component mixtures of the oxides of uranium, plutonium, and/or thorium.

Accordingly, it is an object of the present invention to provide a clad nuclear fuel element which assures an excellent and constant thermal contact between the fuel and the clad, and which provides a symmetrical pattern and controllable limits to the extent of strain cycling of the cladding.

It is a further object of the present invention to provide a clad fuel element which presents a minimum of parasitic neutron absorption in the clad material.

It is another object of the present invention to provide a nuclear fuel clad which is inexpensive and may easily be fabricated.

It is still another object of the present invention to provide an improved clad nuclear fuel element in which the clad alone (that is in the absence of the nuclear fuel) is not sufficiently strong to resist the pressure of the coolant or moderator or both acting on the exterior of the clad, which clad is supported against such pressure by the fuel, and which clad is flexible and thereby is capable of accommodating dimensional changes of the fuel with temperature and with irradiation, to assure good thermal contact with the fuel contained therein while providing the required corrosion resistance and low parasitic neutron absorption.

Other objects and advantages of this invention will become apparent to those skilled in the art as the description and illustration thereof proceed.

Briefly, in accordance with one aspect of this invention, the improved nuclear reactor fuel element assembly comprises a plurality of nuclear fuel elements supported together in substantially fixed positions, and adapted for passing a coolant fluid through heat exchange relation with said nuclear fuel elements; each of said fuel elements comprising an elongated body of nuclear fuel material, a corrosion-resistant clad tube surrounding said fuel material and provided with at least one longitudinal ridge or fold permitting said clad tube to deflect in response to variations in external pressure and in response to differential thermal expansion and contraction of said fuel material and said clad tube to maintain said clad tube in direct contact with said fuel material under variable operating conditions, and means sealing the ends of said clad tube. Another aspect of this invention comprises the individual fuel element as above defined.

The subject matter which is regarded as the invention is particularly pointed out and distinctly claimed in the concluding portion of the specification. The invention, however, both as to its organization and method of operation, together with further objects and advantages thereof, may best be understood by reference to the following description take in connection with the accompanying drawings in which:

FIGURE 1 is a schematic elevation view in partial cross-section of a nuclear power reactor system embodying the present invention;

FIGURE 2 is a simplified cross section view of the nuclear vessel and reactor core of FIGURE 1;

FIGURE 3 is a foreshortened partial cross section view of a fuel assembly;

FIGURE 4 is a transverse cross section view of the fuel assembly of FIGURE 3;

FIGURE 5 is a view in partial cross section of a fuel element constructed in accordance with the teachings of the invention;

FIGURE 6 is a cross section of the fuel element of FIGURE 5 taken along line 6—6;

Figure 7:
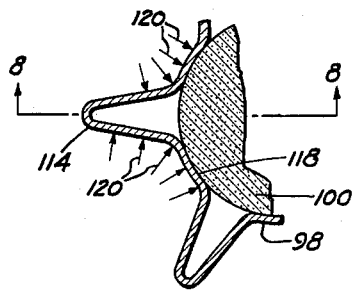
FIGURE 7 is an enlarged partial cross section view showing a fold or ridge in the clad of the fuel element of FIGURE 5.

Referring now more particularly to FIGURE 1, a schematic flow diagram of a nuclear power reactor system is shown which details the reactor vessel in partial cross section and in which the fuel assemblies and fuel elements embodying the present invention may be utilized. Nuclear reactor vessel 10 is provided with removable head 12, the two being removably secured together by means of a pair of flanges 14. Supported within vessel 10 is reactor core 16 made up of a plurality of vertically disposed fuel assemblies 18 provided with flow channels as subsequently described in FIGURES 3 and 4. Reactor core 16 is supported by means of lower core support plate 20 and brackets 22. Plate 20 also supports thermal shield 24 surrounding core 16 between the core and the vessel 10 to minimize gamma ray heating of the vessel. The fuel assemblies 18 are secured in position at their upper ends by means of upper core support 26 and brackets 28. Control elements 30 are shown extended into core 16 and are reciprocable by means of control rod drive mechanisms shown connected at the bottom of vessel 10. Only two such devices are shown for purposes of ease of illustration, the actual number being dependent on the size of the core and the nature of the control elements.

A neutron moderating coolant is introduced by means of lines 34 and 36 at the bottom of vessel 10. Suitable moderating coolants include light water, heavy water, mixtures of these materials, or the known organic moderating liquids. This liquids flows upwardly through core 16 passing through the individual flow channels provided in each nuclear fuel assembly. During this passage, the fluid absorbs heat released in the fuel elements of each assembly and carries it from the system through outlet lines 38 and 40. A turning vane 42 may be positioned in the upper part of vessel 10 to redirect the heated fluid discharged from the core into these outlet lines. The heated fluid is discharged into vessel 44 which may be a steam separator in the case of a boiling reactor or it may be a stream generator in the case of a pressurized liquid reactor.

In the case of a boiling reactor, a partially vaporized coolant stream is separated in vessel 44. The vapor phase passes by means of line 46 at a rate controlled by valve 48 into turbine 50. The separated liquid phase is removed through line 52 at a rate controlled by pump 54, control valve 56, and liquid level controller 58. This liquid is returned through lines 34 and 36 to the reactor for revaporization. In the case of a pressurized liquid reactor, vessel 44 is a steam generator having a heating coil, not shown, which provides the path through vessel 44 for heated liquid from lines 38 and 40 and discharges the coolant liquid through line 52 for return to the reactor. Surrounding this coil is a vaporizable liquid such as water from which steam is generated and carried through line 46 into turbine 50 as before.

In either case turbine 50 drives a load such as generator 58. Exhaust steam is condensed in condenser 60. Non-condensible gases are removed through line 62 controlled by valve 64 by means of an air ejector not shown. Condensate is removed from condenser 60, line 66, by means of condensate pump 68 at a rate controlled by valve 70 and liquid level controller 72. The condensate is pumped through one or more feedwater heaters such as 74 and 76 and returned by means of line 78 to vessel 44. Here the condensate is mixed with the unvaporized portion of reactor vapor coolant in the case of a boiling reactor, or the condensate is revaporized by indirect heat exchange with liquid reactor coolant in the case of a non-boiling or pressurized liquid moderated and cooled reactor.

Referring now to FIGURE 2, a cross section view of reactor vessel 10 is taken at the position shown in FIGURE 1. In this view appear reactor vessel 10 surrounding thermal shield 24 which in turn surrounds reactor core 16 made up of a plurality of fuel assemblies 18. As it appears in this drawing, core 16 is approximately circular in horizontal cross section and is made up of a plurality of fuel assemblies 18 provided with flow channels of substantially square cross section.

In FIGURE 3 is shown a vertical foreshortened elevation view of a fuel assembly 18. This fuel assembly consists of a tubular flow channel 80 of square cross section provided at its upper end with lifting bale 82 and at its lower end with its nose piece 84. The upper end of channel 80 is open at 86. The lower end of nose piece 84 is provided with openings 88. An array of fuel elements 90 is enclosed with channel 80 and supported therein by means of upper and lower end plates 92 and 94 respectively. The liquid coolant ordinarily enters through openings 88, passes upwardly around fuel elements 90, and discharges at upper outlet 86 in a partially vaporized condition (boiling reactors) or in an unvaporized (pressure liquid reactors) condition at increased temperature.

In FIGURE 4 is shown a transverse cross section view of the fuel assembly shown in FIGURE 3. This view indicates that the assembly contains a 6 x 6 square array of 36 fuel rods 90 enclosed within the space 96 provided in square tubular flow channel 80. This view also indicates fuel material 100 is enclosed within a clad tube 98 provided with ridges or folds 114 according to this invention.

Referring to FIGURE 5, a fuel rod or element 90 constructed in accordance with the teachings of the present invention is shown. The fuel element includes fuel material 100, here shown as a plurality of fuel pellets of fissionable and/or fertile material positioned within a structural clad tube 98. The clad tube is sealed at its ends by means of end plugs 102 and 104 which may include studs 106 and 108 to facilitate the mounting of the fuel rod in the assembly. A void space 110 is provided at one end of the fuel element to permit longitudinal expansion of the fuel material and accumulation of gases released from the fuel material. A helical member 112 is positioned within space 110 to provide internal support for that part of clad tube 98 surrounding void 110 and which is not otherwise supported against the external pressure of the moderator-coolant fluids. Clad tube 98 is provided with a series of longitudinal ridges or folds 114. These folds are substantially U-shaped in cross section, are uniformly spaced around the periphery of the tube, and extend substantially along the entire length of the clad tube. The structural clad tube 98 may be secured to the end plugs 102 and 104 by means of circumferential welds 116.

As noted above, the pressure of the coolant fluid surrounding the fuel element 90 forces the clad 98 into intimate contact with the exterior surface of the fuel material 100 because the clad is flexible in the radial direction due to the presence of longitudinal folds 114. The differential expansion of the fuel pellets and the clad tube material also may aid in maintaining tight contact between the fuel material and the clad. Since the folds are longitudinal, the clad material is given added resistance to bowing thereby providing a more rigid fuel element. Since the longitudinal folds 114 of the clad tube 98 increase the resistance to bowing, the use of thinner clad material is permitted for a given degree of bow thereby reducing extraneous material and parasitic neutron absorptions in the core according to the teachings of this invention. Thus the fuel element according to this invention provides an excellent thermal contact between the fuel clad tube and the fuel material, a minimum of parasitic neutron absorption, and a maximum resistance to bowing and vibration which is occasionally caused by flow of the coolant at high velocity. The symmetrical disposition of the ridges 114 about the axis of the fuel cylinder eliminates or minimizes the existence of complex triaxial stress patterns which otherwise can result in uncontrolled localized strain cycling of the clad material. The provision for symmetrical expansion of the fuel-clad perimeter also eliminates or minimizes stress patterns which result in undesirable bowing of the fuel tube when irregular patterns of ridges or wrinkles are present.

Referring now to FIGURE 6, a cross section view of the fuel element 90 of FIGURE 5 taken along line 6—6 is shown. The fuel material 100 is surrounded by the longitudinally ridged or folded clad tube 98 and held in intimate contact with the fuel at the clad-fuel interface 118 through the action of external coolant pressure and the differential expansion of the fuel 100 and the clad 98. A plurality of longitudinal folds or ridges 114 are provided in clad tube 98 to permit radial expansion of the clad while increasing the desirable structural characteristics of the clad in a longitudinal direction. The folds or ridges 114 in tube 98 may be formed by any convenient means such as, for example, extrusion, embossing, drawing or rolling. It is also possible to form such ridges in a clad tube by exerting high external pressure on a cylindrical cladding structure which is oversize in relation to the fuel pellets contained therein. The tube is embossed before pressure application to form precursors of the ridges as longitudinal indentations. The pressure is then applied and the cylindrical clad then collapses to form a symmetrically ridged structure such as shown in FIGURE 6. The preliminary embossing prevents the formation of randomly positioned ridges, prevents bowing of the fuel rod, and forms ridges which are uniformly spaced and coaxial with the tube.

Referring to FIGURE 7, an enlarged portion of a single fold or ridge 114 of the type shown in FIGURE 6 is illustrated. The entire clad tube 98 including fold 114, upon being subjected to an external pressure of a coolant as indicated by the arrows 120, is pressed into direct contact with the fuel material 100 at the interface 118. Because of the thinness of the clad and its radial flexibility, this contact is maintained in spite of exterior fluid pressure variations and in spite of the differential expansion between the clad and the fuel.

Figure 8:
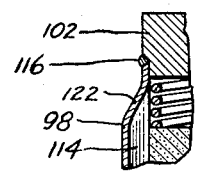
FIGURE 8 is a view in partial cross section of the end of the fuel element of FIGURE 5 showing the clad tube-end plug joint.

FIGURE 8 shows a partial elevation in cross section of the folded cladding and pellet of FIGURE 7. The fold 114 of the clad tube 98 may be tapered at 122 to conform to the shape of the cylindrical end plug 102 to provide a contact therebetween suitable for sealing. The folded clad tube 98 may be secured to the end plug by any convenient means such as, for example, welding as shown at 116.

Figure 9:
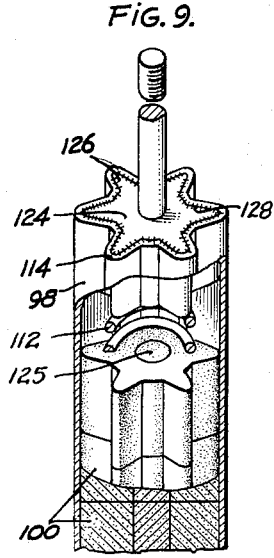
FIGURE 9 is an isometric view of one end of a fuel element according to this invention and which utilizes a modified end plug fitting.

FIGURE 9 shows an alternative end plug-clad tube seal. Here end plug 124 has been milled to provide longitudinally extending radially projecting fins 126 which register with the folds 114 at the end of the clad tube 98. The weld at 128 follows a serpentine path and joins the end plug 124 to the end of clad tube 98. Helical support means 112 and fuel material 100 are also shown.

Figure 10:
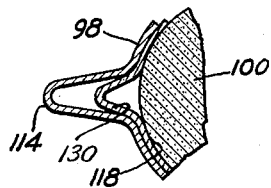
FIGURE 10 is a partial view of a transverse cross section of a fuel element according to this invention in which a clad tube liner is used.

FIGURE 10 shows a view similar to that of FIGURE 7 and in which a clad tube liner is used. Fuel material 100, such as pellets, is immediately surrounded by inner clad liner 130 which may be fabricated of a material the same as or different from that of outer folded clad tube 98. For example, the liner 130 may be of zirconium while tube 98 is stainless steel whereby the benefits of stainless steel corrosion resistance and the low neutron capture cross section of zirconium may be realized in a single fuel element. Liner 130 may be folded as shown in FIGURE 10, or it may be cylindrical with a longitudinal slot, the edges of which may overlap.

EXAMPLE

An example of a cylindrical rod of uranium oxide composed of a stack of pellets clad with structural material in accordance with the teachings of the present invention will now be given. For purposes of analysis, reference may be had to FIGURE 11 which indicates the dimensions of a clad tube fold in terms of height ($h$), gap at base ($a$), and thickness ($t$). For a given thickness of clad, and a given tolerance in the initial room temperature dimensions of the fuel pellet and the clad tube, the size and number of folds required are given in the following table.

Table.—Nominal dimensions before assembly

[Clad tube is Type 316 or 304 stainless steel]

| | |
|---|---|
| $UO_2$ rod, O.D. inches | 0.500±0.005 |
| Clad tube, I.D. inches | 0.510±0.001 |
| Clad thickness ($t$) inches | 0.008±0.001 |
| Folds: | |
|   Number | 6 |
|   Height ($h$) inches | 0.125 |
|   Gap at base, ($a$) | 0.010 |
|   Separation, degrees | 60 |

Figure 11:
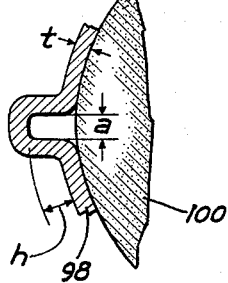
FIGURE 11 is a semischematic view of a transverse cross section of a fold or ridge in the clad tube of this invention indicating principal dimensions involved in an analysis of stresses in the fold under various operating conditions.

An analysis of the behavior of this fuel element under conditions typical of a boiling water reactor is given. After assembly and pressurizing so that clad is in contact with the fuel, the clad inside perimeter is equal to the fuel outer perimeter plus the "spring-back" due to elasticity. Taking a yield stress of 30,000 p.s.i. at room temperature, the deformation required to yield and permanently deform the clad material at the fold is given by $$\Delta a = \frac{(30{,}000)(0.125)^2}{(45 \times 10^6)(0.008)} = 0.0013 \text{ inch per fold}$$

or a total of 0.0078 inch or 7.8 mils, for six folds. (This calculation is based upon a stress analysis which considers one-half of each leg of the fold as a cantilever beam, and for which the stress is given by $$\sigma = (\text{modulus})\frac{(t)(\Delta a)}{h^2}$$

where $\sigma$ is the stress, $\Delta a$ is the change in ($a$) due to the applied force, and ($t$), ($a$), and ($h$) are dimensions as shown in FIGURE 11. This equation is approximate, and the stress calculated is conservative, that is, on the high side.) After pressurizing the gap produced by "spring-back" is therefore 0.0025" on the diameter. By applying pressure to the tube while hot, the yield strength is reduced and the gap can be made correspondingly smaller.

The expansion of the uranium dioxide ($UO_2$) is given by:

$$(\Delta t_{avg})(\alpha)(D)$$

where $\Delta t_{avg}$ is the change in average temperature of the fuel material, between shut-down and operating conditions, $\alpha$ is the coefficient of thermal expansion of the fuel, and $D$ is the nominal diameter of the fuel rod. For the present $UO_2$ fuel element operating at an average temperature of 1000° C., the net expansion is $$(1000° - 25°)(12.6)(10^{-6})(0.500)$$

or 0.0062 inch. This is a variation of 6.2 mils on the diameter, or 19.5 mils along the periphery of the fuel. For an average clad tube temperature of 650° F. the clad expansion is $$(650° - 100°)(9.6)(10^{-6})$$

or $5.1 \times 10^{-3}$, or 0.51%, or 8.1 mils along the perimeter. Therefore under operating conditions, the fuel perimeter expands 19.5 mils and the clad only 8.1 mils. Allowing for the initial gap of 7.8 mils, the clad is "stretched" 3.6 mils by the differential thermal expansion. This produces a local stress of about 60% of the yield stress at the operating temperature of the clad.

If five folds are used in the fuel element above, the final stress is equal to the yield strength. With seven folds, the final stress is only 33% of the yield stress, and the initial gap (diameter) is 2.9 mils.

Figure 12:
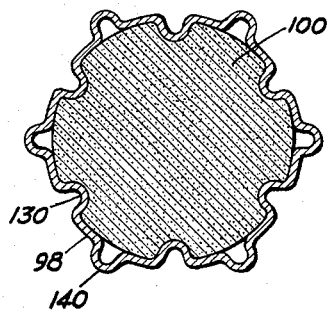
FIGURE 12 show partial transverse cross sections of modified fuel elements embodying this invention.

In addition to the extending outward from the rod, another type of folds or ridges may be used as illustrated in FIGURE 12. For example, one embodiment includes a combination of inward and outward grooves 130 and 140 resulting in a corrugated surface with grooves of curved cross section in the fuel surface which have the effect of significant increase in the surface-to-volume ratio of the fuel which increases the heat removal capability per unit of fuel volume. The surface-to-volume ratio of these fuel elements is substantially higher than the ratio for a right circular cylinder and thus the heat removal capability per unit of fuel volume is increased.

The clad tube material may be chosen from any one of a large number of metals or alloys of metals or cermets containing them, such as, for example, Al, Ni, Mo, Nb, Zr, Mg, or their alloys and stainless steels. The present invention may be applied to fuel shapes other than cylindrical rod-type fuel shapes such as, for example, square, hexagonal, elliptical, oval, irregular cylindrical, hollow tubular, spherical, or other configurations. The dimension of the gap between the sides of each fold and the number of folds provided per element, are chosen so the product of a number of ridges or folds times the gap is greater than the maximum difference in perimeter expected between fuel and clad prior to insertion of the fuel into the clad. Upon application of pressure, the ridges collapse so that the clad is in direct contact with the exterior surface of the fuel. This will normally be accompanied by a permanent yielding of the clad material in and near the fold, so that the clad perimeter is very near the fuel perimeter, with the exception of "spring-back" when pressure is removed. By proper choice of the relative dimension and number of folds, the initial application of pressure will cause the clad to yield until its perimeter is within a precisely known and controllable difference from the fuel perimeter.

Under operating conditions of the reactor, the average temperature of the fuel is higher than the clad temperature so that the fuel will normally expand into contact with the cladding, irrespective of whether the expansion coefficient of the fuel is somewhat greater, or somewhat smaller than that of the clad. This permits achieving a closely specified relative geometry of the fuel and clad without requiring close control of dimensions of either fuel or clad. The production of ridged or folded clad fuel is therefore free from demanding dimensional tolerances therefore permitting economical manufacturing.

The choice of dimensions of the folds and number of folds is also made so that any increase in the cylindrical internal perimeter of the clad, after the initial forming operations, due to greater expansion of the fuel than the clad at normal operating temperatures, is well within the elastic limit of the clad. Prolonged thermal or coolant pressure cycling (such as may occur due to start-up, shut-down, or change in power level of the reactor required for a fuel lifetime of several years) will then produce no significant further change in the relative dimensions of fuel and clad.

A moderate amount of deformation and cracking of the fuel material can also be accommodated without incurring cyclic plastic deformation of the clad, and without major increase in the impedance to the flow of heat from the fuel. In the case of fuel material which is expected to release a significant fraction of its content of gaseous fission products, it is necessary to provide a free volume within the clad for holding the released gases and to limit the accumulation of internal pressure in the fuel element. For fuel materials operated at moderate conditions, the free volume due to the interstices in the fuel, the fuel-to-clad gaps, and the regions between fuel and the end plugs or caps of the fuel cladding may be sufficient. Additional volume may be provided either as a gross void, such as for example the hollow space 110 shown in FIGURE 5 in or near the end plug or cap, axial holes in the fuel, or grooves in the fuel surfaces. It may also be provided by making a portion of the rod as a porous solid with considerable void content. The porous solid may be incorporated in a variety of ways, such as for example, a plug 125 in a hole extending along the initial axis of the fuel material 100 as shown in FIGURE 9, as a washer between sections of fuel material, or as a plug installed between the end cap and the fuel material. One desirable embodiment of the present invention utilizes the longitudinally grooved fuel described and claimed in U.S. Patent No. 3,043,761 issued July 10, 1962, in which thermal fracturing of fuel bodies is controlled along radial planes to avoid the heat conduction inhibition which fission gas accumulation in non-radial fracture planes would otherwise cause.

Fuel material and operating conditions are sometimes chosen such that extensive release (more than 3 to 5 times the free volume within the fuel element) of long-lived fission gases is normally expected, for example when uranium dioxide or uranium carbide is operated at central fuel temperatures near to or above the melting point. For these conditions it is necessary to provide additional void to act as a gas reservoir. This can be provided, for example, by an extension of the fuel clad tube into the reflector regions beyond either or both ends of the fueled region. Since neutron economy is of smaller consequence in the reflector regions, thick wall tubing is used for the reservoir, capable of sustaining the full external pressure without deformation.

Having described the invention in detail, it will be obvious to those skilled in the art that many changes and modifications of the described embodiment can be made without departing from the scope and spirit of the invention. Therefore, this invention is to be considered as limited only in accordance with the teachings thereof as set forth in the claim appended hereto.

I claim:

A nuclear reactor fuel element which comprises an elongated cylindrical body of nuclear fuel material of substantially uniform geometric cross section with length and having a plurality of elongated longitudinal grooves spaced apart from one another on the exterior surface of said fuel material, a clad tube surrounding said fuel material, said clad tube being provided with a plurality of longitudinal folds of substantially U-shaped cross section and uniformly spaced around the periphery and extending substantially along the entire length of said clad tube to permit said tube to deflect radially in response to variations in external pressure and in response to differential expansion and contraction of said fuel material and said clad tube to maintain said tube in direct contact with said fuel material under variable operating conditions, said folds being arranged so that alternate folds project outwardly from the external surface of said clad tube and the remaining folds project inwardly into said elongated grooves, and means sealing the ends of said clad tube.

References Cited by the Examiner

UNITED STATES PATENTS

| | | | |
|---|---|---|---|
| 3,009,869 | 11/1961 | Bassett | 176—76 X |
| 3,043,761 | 7/1962 | Reynolds | 176—90 X |
| 3,085,954 | 4/1963 | Stohr et al. | 176—73 |
| 3,141,830 | 7/1964 | Klepfer et al. | 176—68 |

FOREIGN PATENTS

| | | |
|---|---|---|
| 1,234,242 | 5/1960 | France. |
| 1,302,470 | 11/1962 | France. |

OTHER REFERENCES

"Nuclear Fuel Element," Hausner ed. Reinhold Publishing Co., New York, Nov. 24, 1959. Pages 172 and 173.

L. DEWAYNE RUTLEDGE, *Primary Examiner.*

CARL D. QUARFORTH, REUBEN EPSTEIN,
*Examiners.*

R. C. LYNE, R. L. GRUDZIECKI,
*Assistant Examiners.*